(12) United States Patent
Fang et al.

(10) Patent No.: US 6,189,127 B1
(45) Date of Patent: Feb. 13, 2001

(54) METHOD AND APPARATUS FOR PAT 2 BUS DECODING

(75) Inventors: Calvin Fang, Hacienda Heights; Clayton Backhaus, Yorba Linda; Graham Harding, Mission Viejo; Kazuo Takata, Placentia, all of CA (US)

(73) Assignees: Sony Corporation, Tokyo (JP); Sony Trans Com, Inc., Irvine, CA (US)

( * ) Notice: Under 35 U.S.C. 154(b), the term of this patent shall be extended for 0 days.

(21) Appl. No.: 09/185,252

(22) Filed: Nov. 2, 1998

(51) Int. Cl.[7] .................................................. G06F 11/00
(52) U.S. Cl. ............................................ 714/799; 370/216
(58) Field of Search ........................... 714/799; 370/212, 370/216, 242

(56) References Cited

U.S. PATENT DOCUMENTS

| | | | |
|---|---|---|---|
| 4,751,736 | * 6/1988 | Gupta et al. | 704/230 |
| 5,408,331 | * 4/1995 | Ota | 386/106 |
| 5,535,299 | * 7/1996 | Riedel | 704/212 |
| 5,907,827 | * 5/1999 | Fang et al. | 704/503 |

* cited by examiner

Primary Examiner—Phung M. Chung
(74) Attorney, Agent, or Firm—Blakely, Sokoloff, Taylor & Zafman LLP

(57) ABSTRACT

A system for testing a bus is described. The system utilizes a tester which includes decompression circuitry to decompress digitized ADPCM signals transferred over a bus, data in the decompressed ADPCM signal is used to determine whether data losses or transmission errors are occurring on the bus. When such errors occur, the tester transmits a warning signal.

20 Claims, 9 Drawing Sheets

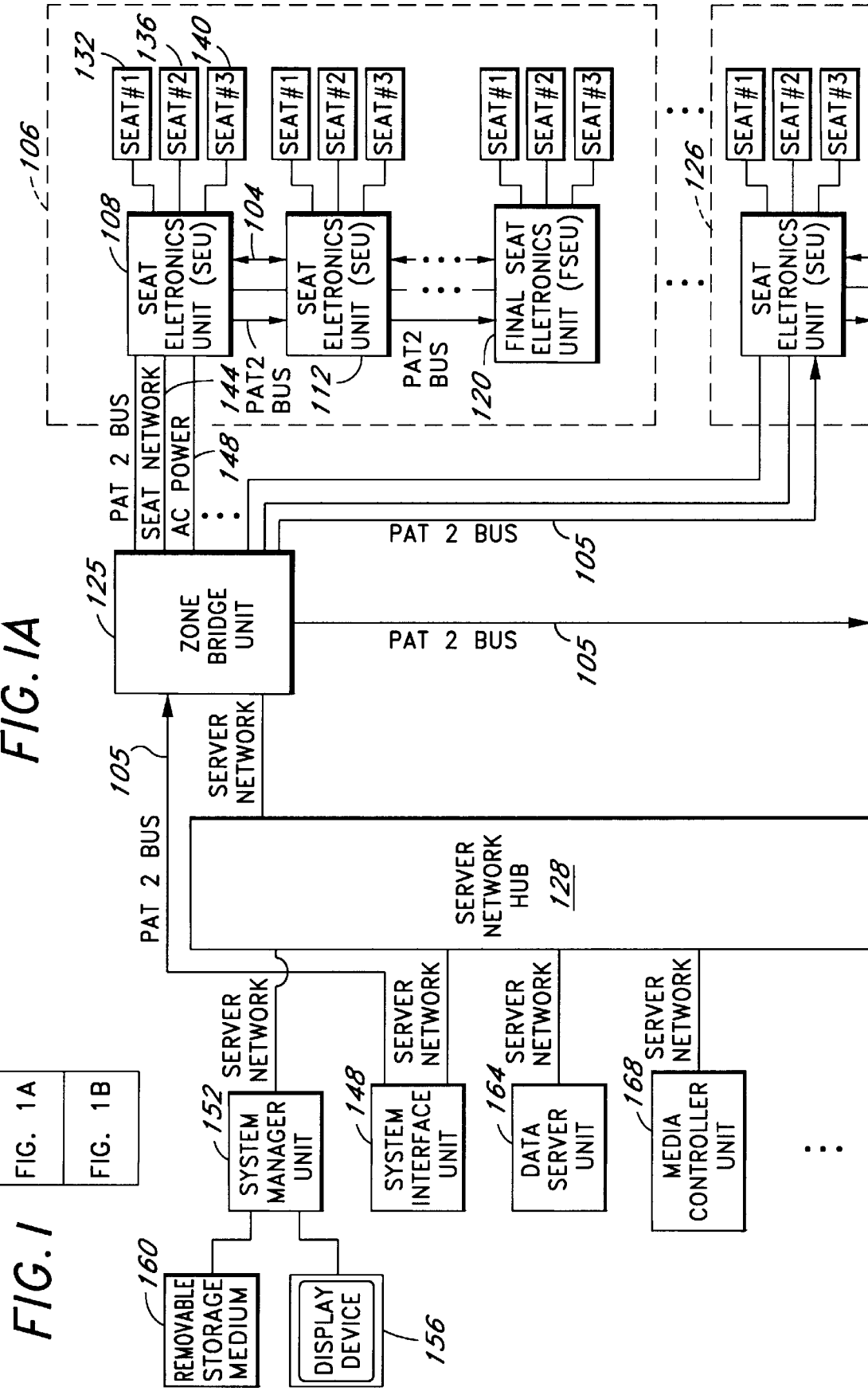

METHOD AND APPARATUS FOR PAT 2 BUS DECODING

BACKGROUND OF THE INVENTION

1. Field of the Invention

The present invention relates to test equipment. More particularly, the invention relates to an apparatus and method for verifying proper operation of a communications bus.

2. Description of Related Art

Over the last few decades, commercial aircraft have become a necessary mode of travel for personal and business reasons. In order to improve passenger comfort, many commercial airlines now offer onboard telephone services as well as in-flight entertainment such as video games, pay-per-view movies, hotel reservation services, and the like. Such amenities require supporting electronics distributed throughout the aircraft. Maintenance of the sophisticated electronics in in-flight entertainment systems (IFES) is a major concern of the airlines.

Airline profitability depends on quick servicing and maintenance of the aircraft. Aircraft servicing typically occurs on the ground, which results in lost flying time and lost profits. Thus, systems which allow quick repairs and facilitate turnaround time are an important part of maintaining and/or increasing airline profitability.

One component which is particularly difficult to troubleshoot is a bus carrying in-flight entertainment data throughout the aircraft. Unlike other components, a bus that carries in-flight entertainment data distributes the data throughout the aircraft, and thus links many different components. Data dropout, noise and bus errors may be introduced at many different points along the bus. The components coupled to the bus may also introduce errors. Determining the source of data errors on a bus can be a time-consuming and tedious procedure. Such troubleshooting consumes service personnel time, and keeps aircraft on the ground.

A second factor which makes troubleshooting difficult is that the IFES system compresses data, such as audio signals using the standard Adaptive Differential Pulse Code Modulation (ADPCM) method. ADPCM compressed data is very sensitive to data errors, as will be explained.

The basic algorithm for the compression of 16-bit linear data to 4-bit ADPCM data and the decompression of 4-bit ADPCM data to 16-bit linear data works as follows. The algorithm finds the difference between the original 16-bit data and the predicted value. Since the difference tends to be a small value, the difference is usually represented by a smaller number of bits. This difference is quantized to a 4-bit compressed pattern using a quantizer step size.

During decompression, the 4-bit compressed pattern is expanded using the same quantization step size to obtain the same linear difference used in compression. To correct for any truncation errors, a binary representation of a value of 0.5 is added during the decompression. This difference is then added to the predicted value to form a prediction for the next sequential 16-bit data. The 4-bit compressed pattern is used to adjust an index into a step size table. This index points to a new step size in the step size table. The index variable and the predicted sample are the two important parameters for decompression.

Since the standard ADPCM algorithm encodes only the difference between consecutive samples, any transmission line error or drop-out of samples will lead to data errors. These data errors are cumulative and are not recoverable. Thus, digital buses are particularly sensitive to drop-outs or transmission line errors.

Thus, a method and device which allows rapid troubleshooting of a bus carrying digital data throughout the aircraft are needed.

SUMMARY OF THE INVENTION

A method and apparatus for testing a bus transferring several channels of audio data is described. The circuitry includes a channel data extractor to retrieve digital data corresponding to a selected channel. A circuit determines when the retrieved data is out of sync and signals an indicator to provide a warning when the data is out of sync.

By coupling the test circuit to various points or nodes along the data bus, a user can quickly determine a general area in which data errors are being introduced onto the bus.

BRIEF DESCRIPTION OF THE DRAWINGS

The advantages of the present invention will become readily apparent to those ordinarily skilled in the art after reviewing the following detailed description and drawings wherein:

FIG. 1 which includes FIGS. 1A and 1B illustrates an exemplary in-flight entertainment system including nodes where the test device can be easily coupled to.

DETAILED DESCRIPTION OF THE INVENTION

The following detailed description describes using a test circuit to test for proper operation of a bus carrying multi-channel digital audio data in a time division multiplexed format. The described circuit extracts digital audio data corresponding to selected channels and determines whether the data is accurate. In one embodiment of the invention, the digital audio data is compressed using adaptive differential pulse code modulation (ADPCM) encoding. The ADPCM encoded data is processed to compute expected index values and predicted sample values based on data stored from previous data frames. The expected index values and predicted sample values are compared to re-sync data periodically rebroadcast by the data source. When the comparison indicates that data errors including data loss or noise has occurred, an indicator warns the user that the data has been corrupted. In one embodiment of the invention, the test circuit also includes circuitry to correct or repair the data. By connecting the test device to different nodes in the circuit, the generalized location of where data errors are being introduced may be determined.

In the following description, various embodiments of the test circuit and the circuit being tested, typically the in-flight entertainment system, will be described. For example, the description will include details including the format and type of data being transmitted, the various components in the in-flight entertainment system, and circuit elements used in the test circuit. However, such details are included to facilitate understanding of the invention and to describe alternate embodiments for implementing the invention. Such detail should not be used to limit the invention to the particular embodiments described because other variations which would be obvious to one of ordinary skill in the art are possible while staying within the scope of the invention.

Figure 1B:
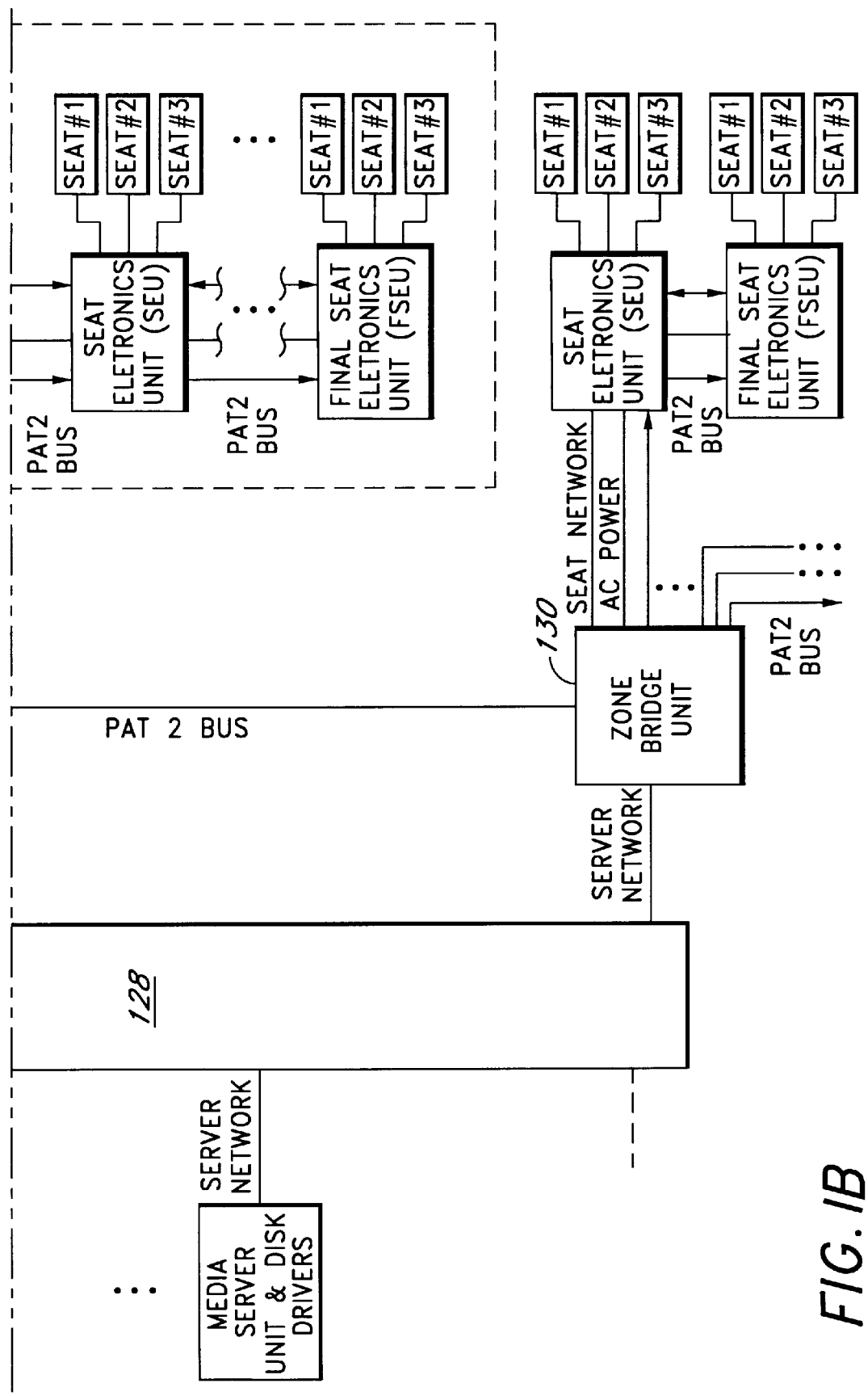

FIGS. 1a and 1b together show an overall schematic view of an in-flight entertainment system (IFES) 100 for airborne applications. IFES 100 includes a multiplexed audio (MA) line or a keyline 102 a Passenger Service System/Audio Telephone ("PAT") bus or interconnection bus 104, and a PAT 2 bus 105 connecting in a chain 106 interconnecting seat electronic units ("SEUs") 108, 112, 120. Each chain 106, is terminated by a final seat electronics unit ("FSEU") 120. A ZBU 124 supports multiple chains 106, 126 and provides each SEU in the chain 106, 126 with the necessary audio and video signals. A Server Network Hub 128 coordinates and communicates the information to and from multiple ZBUs 124, 130 to the SEU chains.

Each SEU, e.g. SEU 108, provides the necessary audio and video signals to support a number of passenger seats 132, 136, 140 in the passenger compartment of an aircraft. In one embodiment an SEU may support two, three or more passenger seats depending on various parameters such as the aircraft configuration used, and the number of slots in an SEU box. In the described embodiment, up to 12 SEUs are chained together although the number of SEUs in a chain may vary.

Each ZBU 124 typically services one section or zone of an aircraft. A ZBU 124 may service multiple chains 106, 126. A typical chain 106, 126 may serve an aisle of a plane while each ZBU 124 serves a plane section. The interconnect bus and keyline together connect each SEU in a chain. Each chain is terminated at a corresponding final seat electronics unit ("FSEU") e.g. FSEU 120.

During initialization, the ZBU 125 distributes enable signals along keyline 102. Other exemplary initialization instructions including address write signals, and ignore instructions may be transmitted along PAT bus or interconnect bus 144. After initialization, keyline 102 may be used for other purposes, such as carrying multiplexed audio signals. During normal usage interconnect bus 144 typically carries telephone signals and passenger service signals. PAT 2 bus carries multiplexed audio signals. In one embodiment the PAT 2 bus is a uni-directional bus carrying 32 channels of digitized audio data. Power is sent along a separate power line 148 and video transmission may occur on a separate video bus (not shown) to the SEUs 108, 112, 120. The SEUs may also be coupled together by other buses to facilitate communication of other information.

Each SEU may also transmit data such as credit card information, entertainment requests, or merchandise orders from individual passengers via seat electronics including handsets (not shown) in the vicinity of passenger seat 132, 136, 140 to the ZBU 124 along the PAT bus 144. This information may be routed through the server network hub 128 to other electronics aboard the aircraft, or in the case of telephone or other communication, to public switched telephone networks ("PSTN") or other external networks outside of the aircraft through a system interface unit 150. A system manager unit (SMU) 152 oversees operation of the in-flight entertainment system IFES. The SMU 152 is coupled to a display device 156 which displays passenger requests and system status information. A removable memory device 160, such as a floppy disk drive, is also provided for removably storing data.

Figure 2:
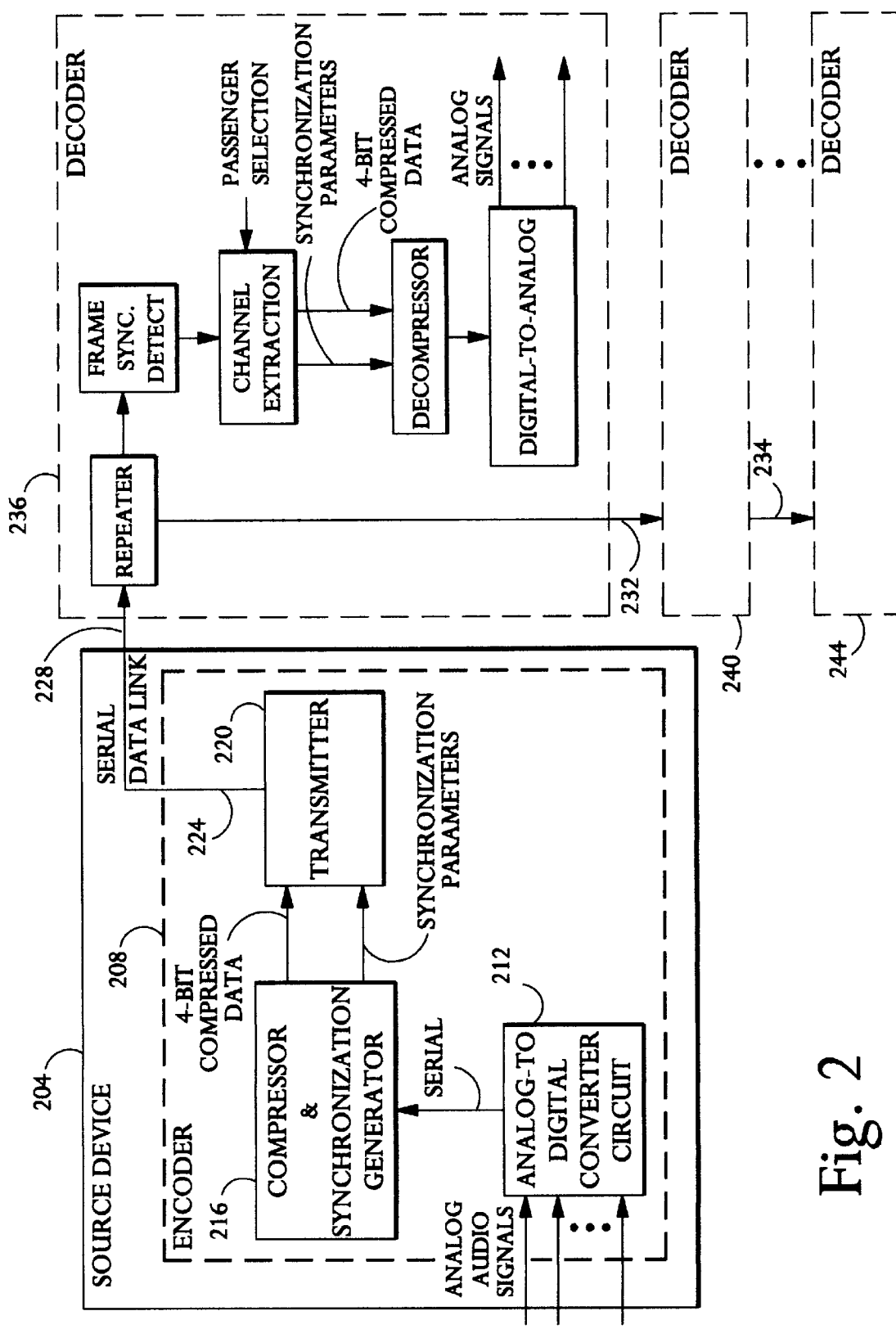
FIG. 2 illustrates one embodiment of a data source device to provide test data.

FIG. 2 illustrates one embodiment of a data source device 204 to provide test data. The system includes a source device 204 containing an encoder 208. Encoder 208 receives analog audio inputs from a number of audio channels. The analog signals are digitized by an analog to digital (A/D) converter circuit 212. The output of A/D converter circuit 212 is transmitted into a compression engine and sync generator 216 to compress the data based on the ADPCM protocol and generate the synchronization parameters. Methods of handling the ADPCM protocol are described in a co-pending application assigned to the same assignee entitled Synchronization Audio Data Compression and Decompression for In-Flight Entertainment System, Application Ser. No. 08/787,690 filed Jan. 23, 1997, and hereby incorporated by reference. The ADPCM technique to compress 16-bit audio data to 4-bit data is well known in the art. A suitable reference is the "Recommendation For Standardized Auto Interchange Format" by the IMA Digital Audio Technical Working Group, Version 2.11, Jul. 14, 1994. The data for all channels and the synchronization parameters form a data frame.

There are two types of synchronization parameters: (1) frame synchronization, and (2) data synchronization. The frame synchronization parameters include a sync header which contains a unique bit pattern, distinguishable from other bit patterns in the frame, to allow the receiver to detect the beginning of a frame. The data synchronization parameter includes a channel number, the ADPCM index and the ADPCM predicted sample value of the data samples for that channel number. The data synchronization parameters allow the receiving unit to update its ADPCM parameters for decompression. The term "synchronization" as used herein refers to the periodic updating of ADPCM parameters so that the test circuit can monitor the IFES for data errors. In actual use, synchronization may also be used to recover from data errors on a real time basis.

The compressed data and the synchronization parameters are fed to transmitter 220 for transmission through a transmission media such as a PAT bus 224 to a receiving unit such as receiving unit 236. During one mode of operation, a receiving unit synchronizes the decompression of data samples based on the data synchronization parameters.

In one embodiment of the invention, the PAT bus carrying data between transmitter 220 and receiving unit 236 is a unidirectional bus conforming to the IEEE RF485 standard. PAT bus 224 may be implemented as a two-wire bus which transmits data using a differential voltage between the two wires. IFES 100 uses a bus such as PAT bus 224 to transmit multi-channel digital audio data in a time division, multiplexed access format. PAT bus 224 may include various nodes 228, 232, 234 in which receivers such as receiving units 236, 240, 244 receive the multiplexed audio data, decompresses it and converts it to an analog signal for audio playback.

Figure 3:
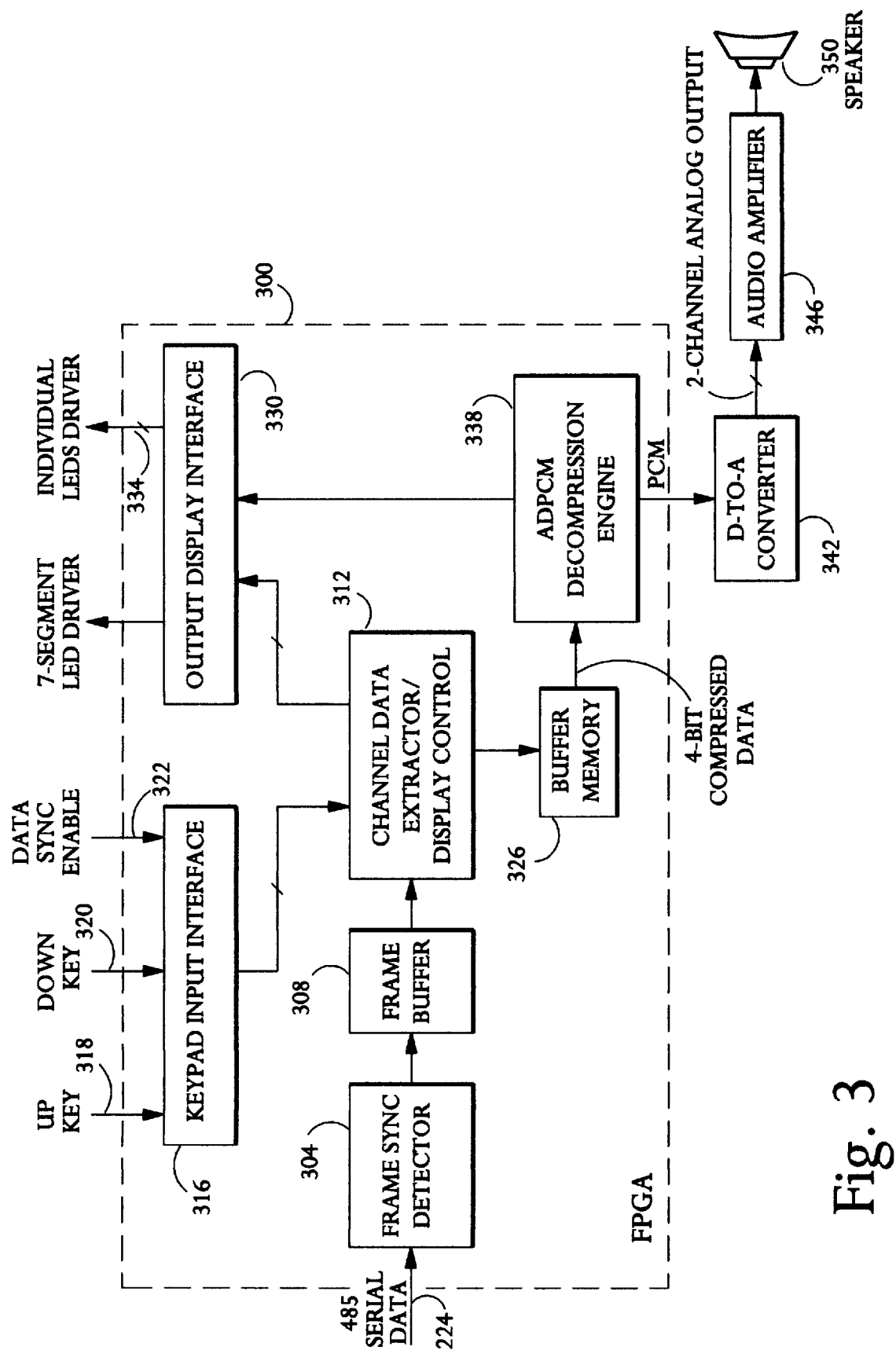
FIG. 3 is an embodiment of the test device used to determine whether and if where other noise and other problems are being introduced into the data bus.

FIG. 3 illustrates one embodiment of a test circuit 300 implemented in accordance with the principles of the present invention. The test circuit can be coupled to various nodes such as nodes 228, 232, 234 to determine whether data errors are being introduced between source device 204 and the node such as node 228 to which the test circuit 300 is coupled.

Test circuit 300 receives digital data along PAT bus 224. In one embodiment, PAT bus 224 is a IEEE 485 serial data bus. A frame sync detector 304 detects the sync header and locates a corresponding ADPCM data sequence. After detecting the presence of the frame synchronization parameter in the sequence, frame synchronization detector 304 removes the frame synchronization parameter and stores the data synchronization parameters and the ADPCM compressed data in a frame buffer 308 for further processing. The data synchronization parameters contains the channel number, the ADPCM index variable and the ADPCM predicted sample value for the compressed data corresponding to the selected channel.

The data from frame sync detector 304 is stored in frame buffer 308 until needed by channel data extractor 312. A control circuit such as a keyboard input interface 316 instructs channel data extractor 312 on how to manipulate data. Keyboard input interface 316 receives user input through various input devices, for example, through up key and down key 318, 320 to select a channel for analysis. In one embodiment, a data sync enable signal transmitted along line 322 indicates to the control circuit whether to correct errors in the data signal. the control circuit transmits the selection of channels and the data enable signal state to channel data extractor 312.

Channel data extractor 312 retrieves the ADPCM compressed data corresponding to the audio channels selected. Data channel extractor 312 may retrieve several channels at a time, for example, in a stereo broadcast, it would be appropriate to retrieve both channels of the stereo broadcast. In one mode of operation, channel data extractor 312 connects each ADPCM compressed pattern corresponding to a channel selected to parallel data segments. These data segments may be stored in buffer memory 326. In one embodiment of the invention, the channels extracted are transmitted to an output display interface 330 which may display the output channel on an indicator device 334 such as a LED digital readout.

Buffer memory 326 stores the segments of ADPCM audio data for each selected audio channel, together with the data synchronization parameters for the selected audio channels. In one embodiment, buffer memory 326 may be implemented by conventional static random access memory (SRAM) devices in a double buffered organizational first-in first-out (FIFO) devices.

Buffer memory 326 transmits each four-bit unit of compressed data corresponding to a channel selected to ADPCM decompression engine 338. Decompression engine 338 decompresses the data by using stored ADPCM index variables from previous transmissions and ADPCM four-bit compressed data to reconstruct the original samples.

In order to detect errors in transmission or data drop-out, the decompression engine 338 also periodically receives new ADPCM index and predicted sample values. The new ADPCM index and predicted sample values should match computed ADPCM index and predicted sample values computed from stored ADPCM index and predicted sample values after processing by the received four-bit unit. In order to preserve bandwidth of the bus, typically, a new index and predicted sample parameter for only one channel is transmitted at each frame time, a new index and predicted sample parameter for a different channel is transmitted in the next frame time such that all thirty-two channels are transmitted over 32 frame time period. The entire process continues to repeat to verify the presence or absence of errors in each channel once every 32 frame times. This updating process synchronizes the ADPCM data for the specified channel.

When there has been no transmission error and no data loss, the four-bit compressed data is sufficient to reconstruct an accurate version of the audio signal. This is because, as described in the background, the ADPCM processes is to progressive process in which recently transmitted 4 byte data samples are used to alter previous ADPCM index and predicted sample variables stored in memory to reconstruct a signal. Because the ADPCM compression engine stores all the ADPCM index variables, and is able to compute the new index variable using the transmitted 4 byte data samples when no errors occur, the ADPCM index variable transmitted once every thirty-two frames is redundant. However, when data loss occurs, the stored or computed index and predicted sample variables will not match the transmitted index and predicted sample variables.

In one embodiment of the invention, compression engine 312 verifies whether data errors occurred during transmission by comparing the ADPCM index variables and predicted sample computed from the ADPCM index and predicted sample value stored in ADPCM compression engine 338 with the new ADPCM index and predicted sample variable received. When the ADPCM index and predicted sample variables match, then the data has been accurately transmitted and no errors have occurred. When the ADPCM index and predicted sample variables do not match, an error has occurred in transmission.

When an error occurs during transmission, ADPCM decompression engine 338 signals output display interface 330 to indicate to the end user that an error occurred in the transmission process. When the data sync is enabled, the ADPCM decompression engine then replaces the inaccurate stored ADPCM index variable and predicted sample with the new ADPCM index and predicted sample variables and continues to compute future ADPCM index and predicted sample variables based on future received four-bit ADPCM samples. Correction of the previous index and predicted sample variables prevents errors from becoming cumulative errors as described in the background of the invention.

ADPCM decompression engine 338 decompresses the received ADPCM data for the selected channels and transmits the decompressed ADPCM data to a digital to analog (D/A) converter 342 which converts the digital signal to an analog output for an audio amplifier 346. The audio amplifier is coupled to a speaker 350 which plays the audio output of the received data corresponding to the selected channels.

Because ADPCM is a progressive encoding technique in which the previous data is used as a seed for computing the next data state using four sample bits, when the original seed data is corrupted, the subsequent data is also corrupted. In standard operation, the ADPCM decompression engine corrects the original seed data by replacing the original seed data, the "ADPCM index and predicted sample variable" with the new ADPCM index and predicted sample variable received once every 32 frames. When the seed data is not replaced, subsequent operations cause progressive deterioration of the data resulting in distortion which can be heard if uncorrected. However, data sync enable 322 allows a setting such that the decompression engine 338 does not correct the "seed data." Thus, when inaccurate data is received, the inaccurate data is processed and errors become cumulative resulting in audible distortion in the reproduced audio signal. Thus, disabling of the data sync enabler allows for use of speaker 350 as an error detection indicator.

In order to determine the number of errors per unit time, the received ADPCM index and predicted sample is corrected when an error occurs. Correcting the ADPCM index and predicted sample variable allows testing circuit 300 to determine whether transmission errors and data loss continues to occur during subsequent data transmissions along PAT bus 224 or whether the detected error was an occasional occurrence and subsequent data is accurate. An indicator, such as a LED indicates when errors are occurring.

Figure 4:
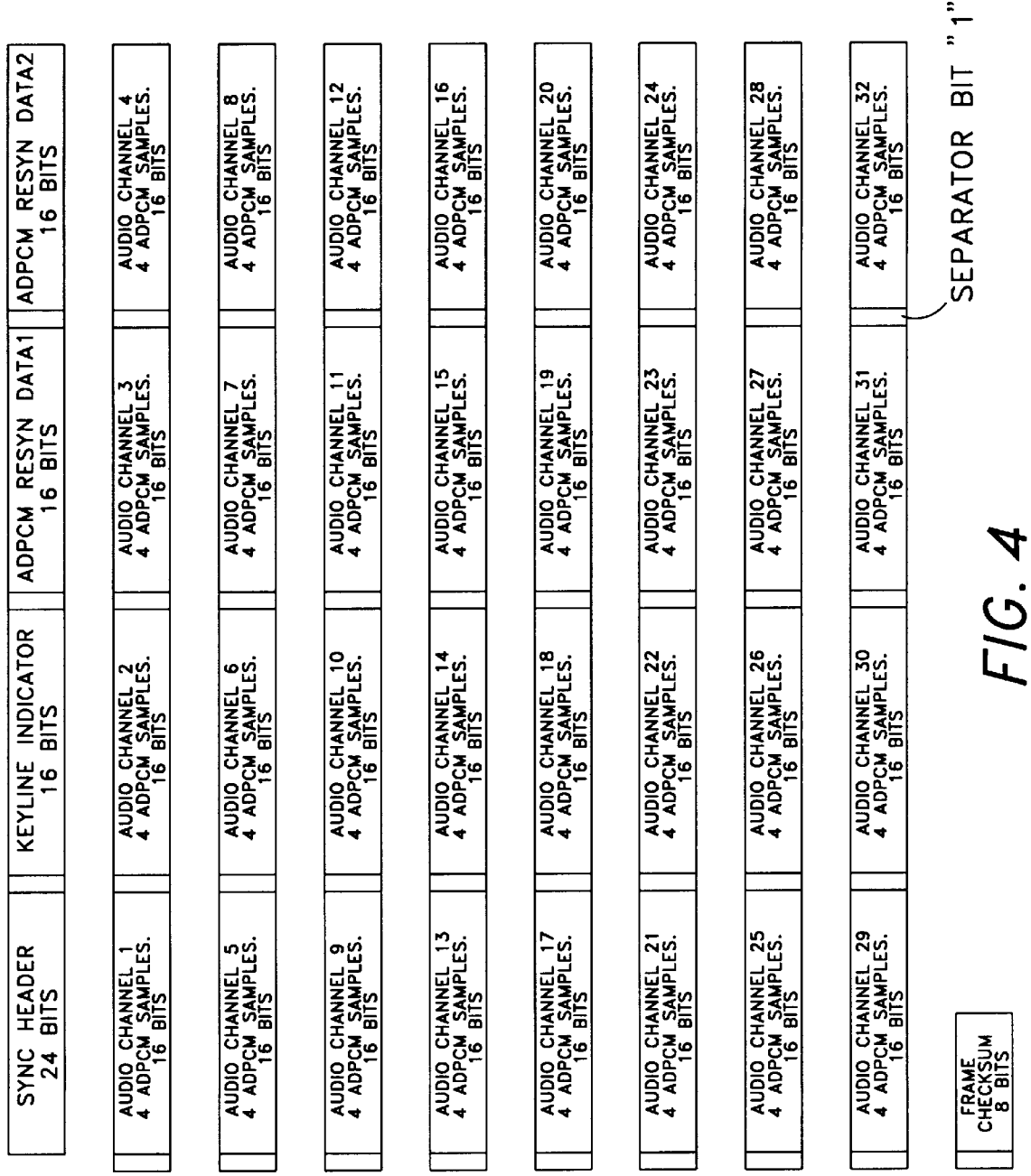
FIG. 4 is an example of a frame of ADPCM data.
Figure 5:
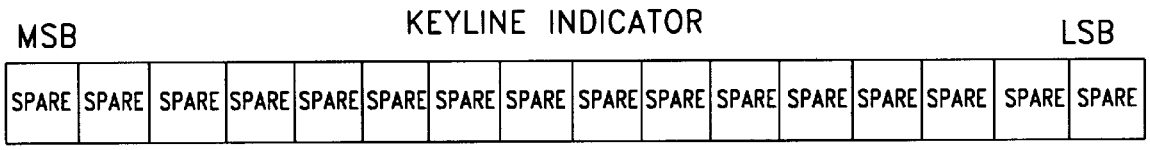
FIG. 5 is an example of the synchronization parameters used to encode ADPCM signals.
Figure 5:
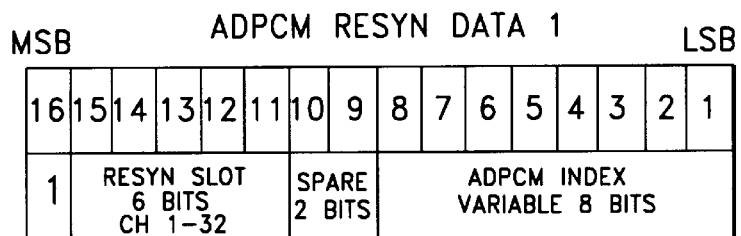
Figure 5:
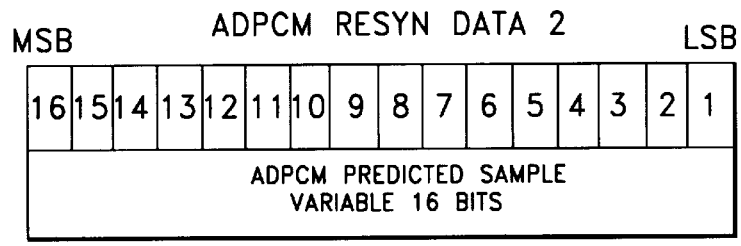
Figure 5:
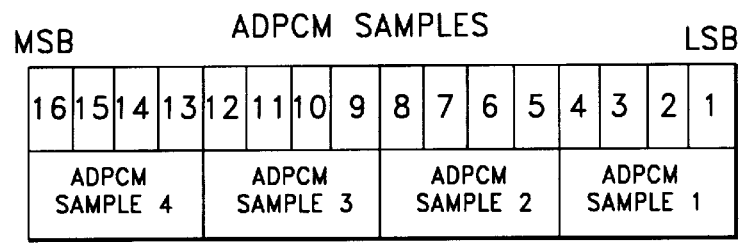

FIG. 4 is an illustration of one frame format of ADPCM data. FIG. 5 describes in detail the synchronization parameters in a frame of ADPCM data. In the embodiment illustrated in FIG. 4, a frame consists of 628 bits divided as follows:

Synchronization parameters (72 bits): Sync header (24 bits), keyline indicator (16 bits), ADPCM Sync Data 1 (16 bits), and ADPCM Sync Data 2 (16 bits). The keyline indicator is used for status information and for general-purpose use. The sync header is the frame synchronization parameter. The ADPCM Sync Data 1 and ADPCM Sync Data 2 form the data synchronization parameters for a selected channel.

ADPCM data (512 bits): The ADPCM data is divided into 32 channels, each channel including 4 ADPCM samples. Each sample has 4-bits for a total of 16 bits of sample data per channel per frame.

Frame checksum: 8-bit checksum data for the entire frame.

Separator bits: At the start of each 16-bit data after the sync header and at the start of the 8-bit frame checksum, there is a separator "1" bit, for a total of 36 bits. These separator bits are employed to ensure that other than the sync header, a frame cannot contain any string having more than 16 consecutive zeros.

FIG. 5 is an illustration of the format of the synchronization parameters and the ADPCM samples.

In one embodiment, the sync header bit pattern is "1 1 1 0 0 0 0 0 0 0 0 0 0 0 0 0 0 0 0 0 0 0 0 0"

Since the separator bits ("1" bits) are placed at the start of every 16 bits and the 8-bit checksum, the above bit pattern is unique to the sync header because it contains 21 consecutive zeros.

The keyline indicator is used to indicate if a particular channel keyline is active. Extra bits are reserved for future use, such as status indicators (e.g., switch ON/OFF). It is also available for other general-purpose uses.

The ADPCM Sync Data 1 has 16 bits:

Bit 15 (MSB): VALID bit, 1 if Valid, 0 otherwise.

Bits 10–14: Channel number, 5 bits for 32 channels.

Bits 8–9: spare.

Bits 0–7: ADPCM index variable corresponding to the channel number (bits 10–14).

ADPCM Sync Data 2 is the 16-bit ADPCM predicted sample variable of the audio sample corresponding to the channel number specified in ADPCM Resync Data 1.

The ADPCM samples are 16-bit, divided into four 4-bit ADPCM samples.

The audio data stream to be transmitted represents the sequence of the data frames with the above format.

The time sequence for transmission of the frames is shown below:

| Time t | Frame |
| --- | --- |
| 1 | Sync data for channel 1 at time t = 1 |
| | Channel 1: 4 ADPCM samples at t = 1 |
| | Channel 2: 4 ADPCM samples at t = 1 |
| | ... |
| | Channel 32: 4 ADPCM samples at t = 1 |
| 2 | Sync data for channel 2 at time t = 2 |
| | Channel 1: 4 ADPCM samples at t = 2 |
| | Channel 2: 4 ADPCM samples at t = 2 |
| | ... |
| | Channel 32: 4 ADPCM samples at t = 2 |
| ........... | |
| 32 | Sync data for channel 32 at time t = 32 |
| | Channel 1: 4 ADPCM samples at t = 32 |
| | Channel 2: 4 ADPCM samples at t = 32 |
| | ... |
| | Channel 32: 4 ADPCM samples at t = 32 |

-continued

| Time t | Frame |
| --- | --- |
| 33 | Sync data for channel 1 at time t = 33 |
| | Channel 1: 4 ADPCM samples at t = 33 |
| | Channel 2: 4 ADPCM samples at t = 33 |
| | ... |
| | Channel 32: 4 ADPCM samples at t = 33 |
| ........... | |

At each frame time, all 32 channels are transmitted but only one set of channel synchronization parameters is sent. The same channel is synchronized every 32 frames. In one embodiment of the present invention, the bit rate is approximately 5.1 Megabits per second (Mbps). Each frame consists of 628 bits. The frame time is approximately 122.88 microseconds. A synchronization period of 32×122.88 microsecond=3.9 milliseconds (ms) is sufficiently small so that any loss of sync can be corrected without noticeable interruption.

Figure 6A:
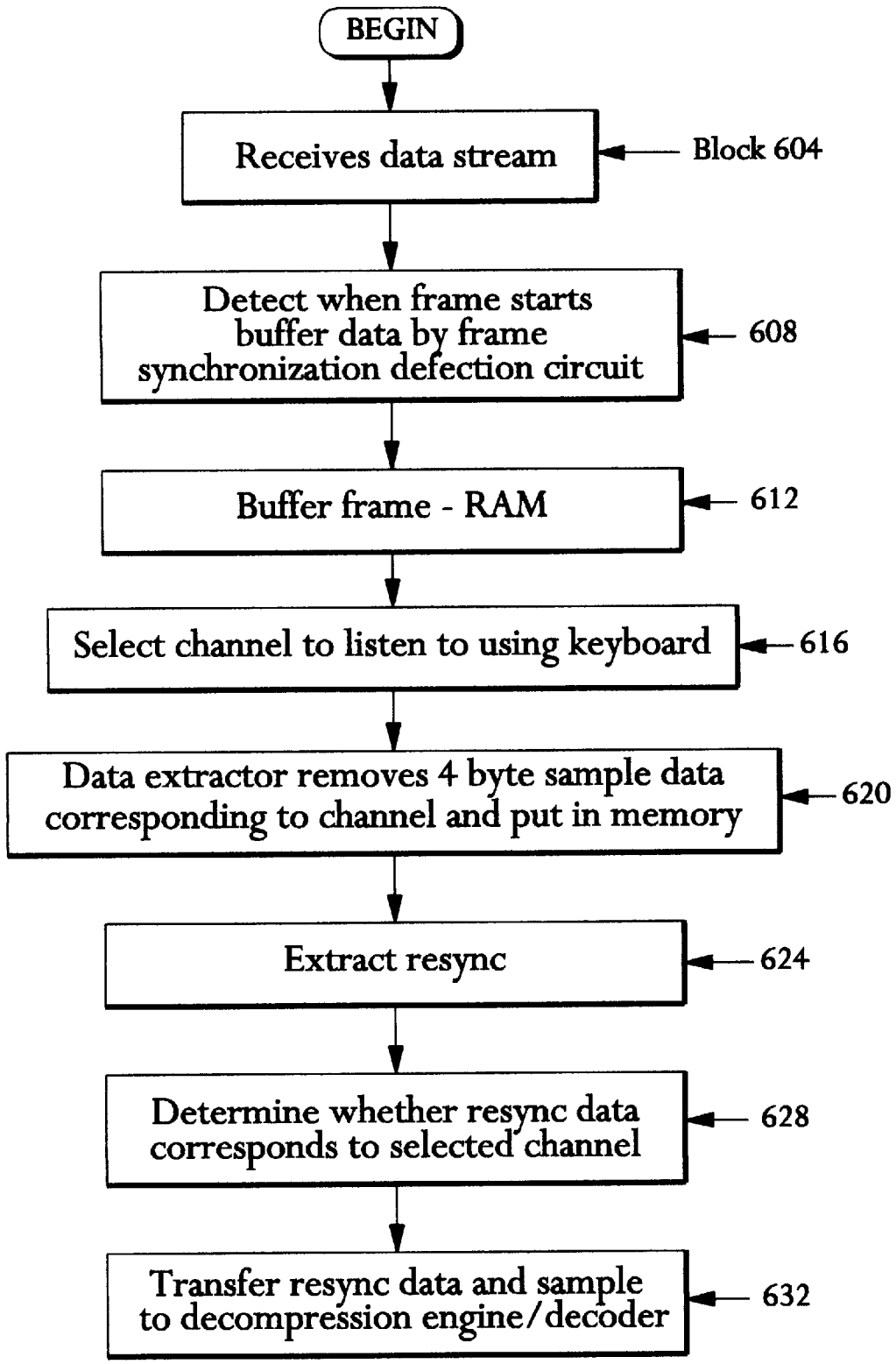
FIG. 6A, 6B, 6C are a flow chart diagrams illustrating one embodiment of using the test circuitry illustrated in FIG. 2.
Figure 6B:
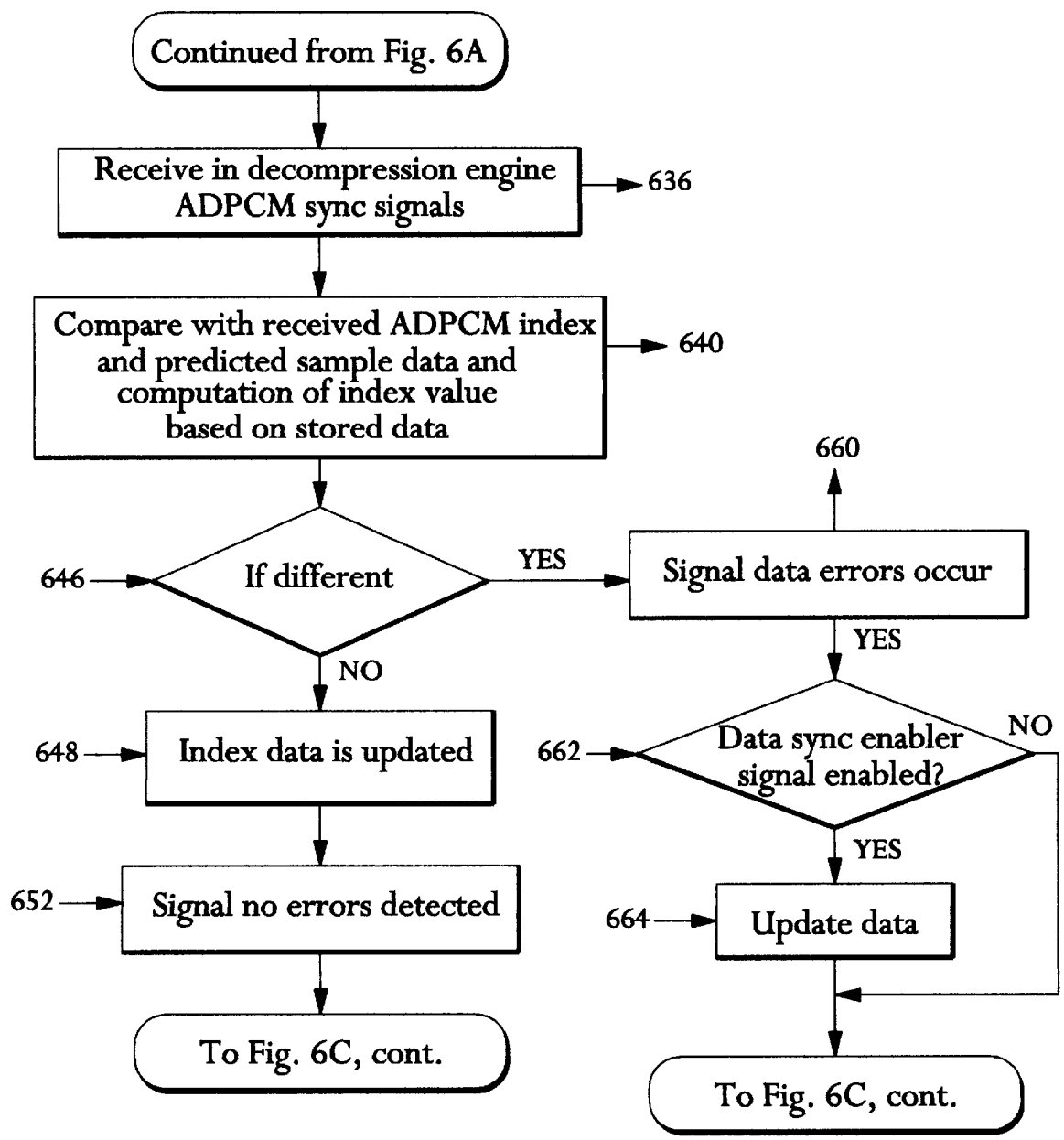

FIG. 6 is a flow diagram illustrating use of the test circuit. In block 604 the test circuit receives the ADPCM compressed data stream. A frame sync detection circuit detects when the frame starts in block 608 and buffers a frame of data in block 612.

In block 616, a control device selects channels for analysis. The selection may be based on received user input. Channel data extractor retrieves data corresponding to the selected channels and stores the retrieved data in a buffer memory in block 620. Typically, two channels are selected to correspond to a stereo signal.

The channel data extractor extracts a re-sync signal or "seed" signal of the received data frame in block 624. In block 628 the extractor circuit determines whether a received resync signal for a particular data frame corresponds to the channel being analyzed. As previously discussed, in a 32 channel system, each channel will only be analyzed once every 32 data frames. When the resync data does correspond to a channel being analyzed, the resync data is transferred to a buffer and stored for use by the decompression engine decoder in block 632.

The ADPCM decompression engine receives the ADPCM sync signals in block 636. The decompression engine determines predicted ADPCM index values based on stored index values from previous index value transmission. The predicted index value may be computed using the four-bit sample data received and the stored index value from the previous index value transmission. The ADPCM decompression engine compares the received ADPCM index value with the computed predicted ADPCM index value in block 640. In decision block 644 the ADPCM decompression determines if the stored index value and the received index value are different.

When the received index values matches, the index value computed from the stored index value of the ADPCM decompression engine updates the stored index value in block 648. Updating of the data is merely a convenience because the received index value and the index value, based on the stored index value, is the same. In one embodiment of the invention, when the index value matches, the ADPCM decompression engine signals that no errors were detected in block 652.

In one embodiment of the test circuitry, the decompression engine to decompresses the received ADPCM signal in block 656 and transfers the data to a D/A converter and amplifier.

Returning to decision block 646, when the index value received does not match the index value computed based on previous index values stored in memory of the ADPCM decompression engine, data has been lost or transmission errors have occurred. The system signals that data errors have occurred in block 660. The test circuit determines how to handle the transmission error by determining whether data sync has been enabled in block 622. When the data sync is enabled, the ADPCM decompression engine updates the data stored in memory to reflect the correct index value in block 664.

When data sync is not enabled in block 620, the ADPCM decompression engine does not update the stored index value.

Figure 6C:
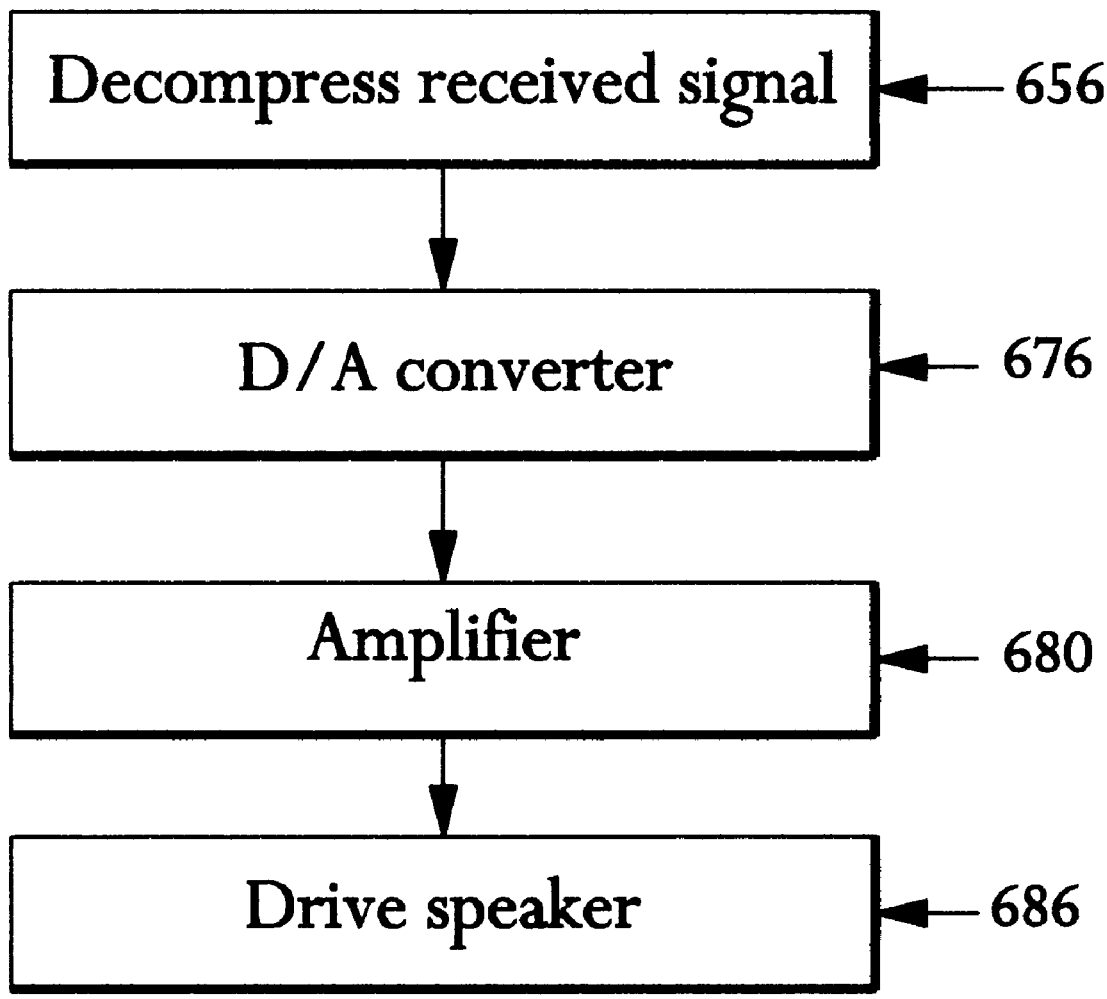

Regardless of whether an error occurred, the decompression engine decompresses the data in block 656 of FIG. 6C. The decompressed data is transferred to a digital to analog (D/A) converter in block 676 which converts the digital data to an analog signal. An audio amplifier amplifies the analog signal in block 680 which drives speaker 686 creating a replication of the sound information encoded by the encoder. When the data sync enable is not asserted, the data is not corrected and cumulative errors cause audible distortion. Thus, one method of testing a bus does not switch on an indicator, but relies on listening to speaker 350 to determine transmission problems.

By moving the test circuit to various points or nodes within the bus, the described test circuit allows rapid verification of the integrity of the PAT bus without disturbing the system operation or setting the system up to a special test mode. The enabling of tapping the bus at multiple points on the system during system operation allows for rapid troubleshooting of the bus.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

We claim:

1. An apparatus for testing a bus transferring a plurality of channels of audio data in an in flight entertainment system, the apparatus comprising:

a channel data extractor to retrieve digital audio data corresponding to a selected channel in the plurality of channels;

a decompression engine to determine when the retrieved digital audio data includes errors; and an indicator to indicate when the decompression engine determines that the retrieved digital audio data includes errors.

2. The apparatus of claim 1 wherein the indicator is a light source coupled to the decompression, the light source set to be a first state when the retrieved digital audio data does not include errors, the light source set to a second state when the retrieval digital audio data includes errors.

3. The apparatus of claim 1 wherein the indicator is a speaker coupled to the decompression engine, the speaker to provide an audio indication when the retrieved digital audio signal includes errors.

4. The apparatus of claim 1 wherein the decompression engine includes circuitry to correct data errors in the retrieved audio data.

5. The apparatus of claim 4 further comprising:

a switch to prevent the decompression engine from correcting errors in the retrieved digital audio signals.

6. The apparatus of claim 5 wherein the decompression engine is coupled to a speaker to allow monitoring of the uncorrected retrieved digital audio data.

7. The apparatus of claim 1 further comprising a digital to analog converter to convert the output of the decompression engine into analog data for use by an audio amplifier.

8. A method for determining the location of errors in a bus transferring a plurality of channels of adaptive differential pulse code modulation (ADPCM) audio data comprising:

retrieving ADPCM digital audio data corresponding to preselected channels from a bus;

determining whether the retrieved ADPCM digital audio data includes data errors; and indicating when data errors are detected.

9. The method of claim 8 wherein the determining whether the retrieved ADPCM digital audio data includes data errors includes comparing a received ADPCM index value to a computed ADPCM index value.

10. The method of claim 9 wherein the determining whether the retrieved ADPCM digital audio data includes data errors includes comparing a received ADPCM predicted sample value to a computed predicted sample value.

11. The method of claim 10 wherein the computed predicted sample value is based on a predicted sample value transmitted in a previous data frame.

12. The method of claim 9 wherein the computed ADPCM index value is based on an ADPCM index value transmitted in a previous data frame.

13. The method of claim 9 further comprising:

receiving a data sync enable signal; and updating a memory with the received ADPCM index value hen the computed ADPCM index value and the received ADPCM index value do not match.

14. The method of claim 10 further comprising:

receiving a data sync enable signal; and updating a memory with the received predicted sample value when the computed predicated sample value and the received predicted sample value do not match.

15. The method of claim 8 further comprising:

decompressing the ADPCM digital audio data; and converting the decompressed ADPCM digital auduio data into an analog signal.

16. The method of claim 15 further comprising:

amplifying the analog signal; and converting the amplified audio signal to a sound wave using a speaker.

17. The method of claim 8 further comprising:

moving a circuit retrieving ADPCM digital audio data to a different location along a bus;

retrieving a second set of ADPCM digital audio data corresponding to preselected channels from the bus; and determining whether the second set of ADPCM digital audio data includes data errors.

18. An apparatus for testing a bus transferring a plurality of channels of adaptive differential pulse code modulation (ADPCM) audio data, the apparatus comprising:

a channel data extractor to retrieve digital ADPCM audio data corresponding to a selected channel in the plurality of channels;

a decompression engine to determine when the retrieved digital ADPCM audio data includes errors; and an indicator to indicate when the decompression engine determines that the retrieved digital ADPCM audio data includes errors.

19. The apparatus of claim 18 further a control circuit to prevent the decompression from correcting errors in the retrieved digital ADPCM audio data.

20. The apparatus of claim 19 wherein the output of the decompression engine is transmitted to an amplifier and a speaker to monitor the output of the decompression engine.

* * * * *